(12) United States Patent
Lesartre et al.

(10) Patent No.: US 10,318,205 B2
(45) Date of Patent: Jun. 11, 2019

(54) MANAGING DATA USING A NUMBER OF NON-VOLATILE MEMORY ARRAYS

(71) Applicant: HEWLETT PACKARD ENTERPRISE DEVELOPMENT LP, Houston, TX (US)

(72) Inventors: Gregg B. Lesartre, Fort Collins, CO (US); Martin Foltin, Fort Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/113,901

(22) PCT Filed: Jan. 30, 2014

(86) PCT No.: PCT/US2014/013849
§ 371 (c)(1),
(2) Date: Jul. 25, 2016

(87) PCT Pub. No.: WO2015/116100
PCT Pub. Date: Aug. 6, 2015

(65) Prior Publication Data
US 2016/0350028 A1    Dec. 1, 2016

(51) Int. Cl.
*G06F 3/06*    (2006.01)
*G06F 12/08*    (2016.01)
(Continued)

(52) U.S. Cl.
CPC .......... *G06F 3/0647* (2013.01); *G06F 3/0604* (2013.01); *G06F 3/0619* (2013.01);
(Continued)

(58) Field of Classification Search
CPC .... G06F 3/0647; G06F 3/0604; G06F 3/0619; G06F 3/0653; G06F 3/0685; G06F 12/08; G06F 12/0806; G06F 11/144; Y02D 10/13
See application file for complete search history.

(56) References Cited

U.S. PATENT DOCUMENTS 6,795,890 B1 *  9/2004  Sugai ................... G11C 16/102
                                                        365/185.29
7,424,593 B2    9/2008  Estakuri et al.
(Continued)

FOREIGN PATENT DOCUMENTS

WO    WO-2013039494    3/2013

OTHER PUBLICATIONS

Bailey, K. et al.; "Operating System Implications of Fast, Cheap, Non-volatile Memory"; Apr. 14, 2011; 5 pages.
(Continued)

*Primary Examiner* — Hiep T Nguyen
(74) *Attorney, Agent, or Firm* — Hewlett Packard Enterprise Patent Department

(57) ABSTRACT

A method for managing data using a number of non-volatile memory arrays is described. The method includes writing data from a volatile memory region to a first non-volatile memory array. The method also includes writing a remaining portion of the data from the volatile memory region to a second non-volatile memory array in response to detecting that an event has occurred. The second non-volatile memory array has a lower write latency than the first non-volatile memory array.

21 Claims, 6 Drawing Sheets

(51) Int. Cl.
*G06F 11/14* (2006.01)
*G06F 12/0868* (2016.01)

(52) U.S. Cl.
CPC .......... *G06F 3/0653* (2013.01); *G06F 3/0685* (2013.01); *G06F 11/1441* (2013.01); *G06F 12/08* (2013.01); *G06F 12/0868* (2013.01); *Y02D 10/13* (2018.01)

(56) References Cited

U.S. PATENT DOCUMENTS

| | | | |
|---|---|---|---|
| 8,286,028 B2 | 10/2012 | Matsuda et al. | |
| 8,327,069 B2 | 12/2012 | Moritoki | |
| 8,392,662 B2 | 3/2013 | Jang et al. | |
| 8,572,416 B2 | 10/2013 | Sutardja et al. | |
| 2004/0172207 A1* | 9/2004 | Hancock | G01R 19/2513 702/60 |
| 2008/0028132 A1* | 1/2008 | Matsuura | G06F 12/0246 711/103 |
| 2008/0155198 A1 | 6/2008 | Factor et al. | |
| 2009/0049334 A1* | 2/2009 | Elliott | G06F 3/0619 714/5.11 |
| 2010/0214813 A1* | 8/2010 | Choi | G11C 5/04 365/51 |
| 2010/0229018 A1* | 9/2010 | Hutchison | G06F 1/30 713/340 |
| 2011/0208998 A1 | 8/2011 | Hosaka | |
| 2012/0131278 A1 | 5/2012 | Chang et al. | |
| 2012/0284587 A1 | 11/2012 | Yu et al. | |
| 2013/0290607 A1 | 10/2013 | Chang et al. | |
| 2013/0332651 A1 | 12/2013 | Iida et al. | |
| 2015/0193299 A1* | 7/2015 | Hyun | G11C 29/52 714/6.24 |
| 2016/0070474 A1* | 3/2016 | Yu | G06F 3/0608 711/103 |
| 2016/0216910 A1* | 7/2016 | Phan | G11C 11/5628 |
| 2016/0259697 A1* | 9/2016 | Takada | G06F 9/4401 |
| 2016/0283336 A1* | 9/2016 | Petersen | G06F 11/2015 |
| 2017/0060426 A1* | 3/2017 | Lee | G06F 3/0604 |

OTHER PUBLICATIONS

Chiu, P-F. et al.; "Low Store Energy, Low VDDmin, 8T2R Nonvolatile Latch and SRAM With Vertical-Stacked Resistive Memory (Memnstor) Devices for Low Power Mobile Applications"; Jun. 2012; pp. 1483-1496; vol. 47; Issue: 6.
International Searching Authority, The International Search Report and the Written Opinion, dated Oct. 27, 2014, 13 Pages.

* cited by examiner

MANAGING DATA USING A NUMBER OF NON-VOLATILE MEMORY ARRAYS

BACKGROUND

Memory devices are used to store data. Memory devices may be either volatile or non-volatile. Volatile memory devices offer quick access to the data, but do not retain the data in the event of power loss. By comparison, non-volatile memory devices retain data even when no power is supplied to the memory device. Non-volatile memory devices may use more time to read data from, and write data to the memory.

BRIEF DESCRIPTION OF THE DRAWINGS

The accompanying drawings illustrate various examples of the principles described herein and are a part of the specification. The illustrated examples do not limit the scope of the claims.

Throughout the drawings, identical reference numbers designate similar, but not necessarily identical, elements.

DETAILED DESCRIPTION

Figure 1:
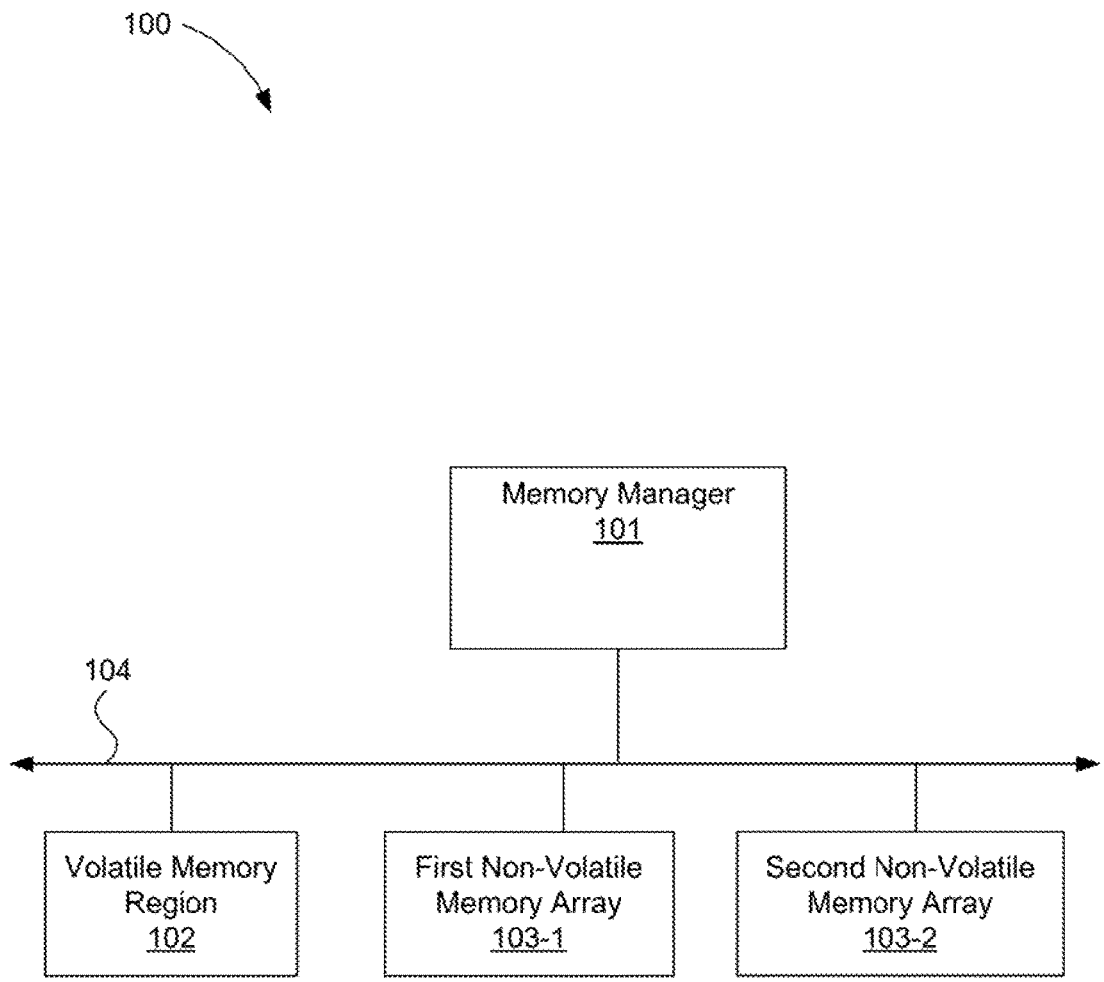
FIG. 1 is a diagram of a system for managing data using a number of non-volatile memory arrays according to one example of the principles described herein.

As described above, business, organizations, and other users may rely on memory to store data. There are various types of memory, for example volatile memory and non-volatile memory. Volatile memory may provide quicker read and write access to the data stored in memory, but does not retain the data when power is removed from the volatile memory. By comparison, non-volatile memory may retain memory even when power is not supplied to the memory device, but non-volatile memory may be slower to write data to, and read data from. These characteristics, and others, may indicate how the memory will be implemented in a computing system.

For example, volatile memory may be used to store data that is frequently accessed in a short amount of time. Volatile memory may also be used as a cache to temporarily hold data to be written to another memory device such as a non-volatile memory array. By comparison, non-volatile memory may be used to store data for long periods of time, for example between powered states of a computing device.

In one specific example, volatile memory may be used as a cache for data before it is stored to a non-volatile memory array. In this example, the non-volatile memory array may operate slower than the volatile memory. Accordingly, the data may be cached in the volatile memory to reduce apparent write latency to the non-volatile memory array. However, while this interaction between volatile memory and non-volatile memory may be beneficial, certain inefficiencies still plague its use.

For example, as described above volatile memory may not retain data in the event of a power loss. Accordingly, data that has been cached on the volatile memory and that has not yet been moved to a non-volatile memory array may be lost in the event of a power failure. Similarly, other data such as state information and other metadata that is stored on the volatile memory may be lost. As metadata is lost, a computing device may not be able to access the data associated with the metadata, or may otherwise be unable to process the data.

Accordingly, the present disclosure describes systems and methods for managing data using a number of non-volatile memory arrays. More specifically, the present disclosure describes systems and methods that allow a memory managing device to maintain an amount of data in a fast volatile memory region during operation. During operation, the data in the volatile memory region may be passed to a first non-volatile memory array from time to time. In the event of a power interruption such as a power cord being unplugged from a computing device, or faulty electrical cabling, the data held in the volatile memory region may be moved to a second non-volatile memory array that produces a quicker write operation as compared to the first non-volatile memory array. As this second non-volatile memory array produces a quicker write operation than the first non-volatile memory array, the likelihood of lost data may be reduced.

The present disclosure describes a method for managing data using a number of non-volatile memory arrays. The method may include writing data from a volatile memory region to a first non-volatile memory array. The method may also include writing a remaining portion of the data from the volatile memory region to a second non-volatile memory array in response to detecting that an event has occurred. The second non-volatile memory array may have a lower write latency than the first non-volatile memory array.

The present disclosure describes a system for managing data using a number of non-volatile memory arrays. The system may include a volatile memory region, a first non-volatile memory array, and a second non-volatile memory array. The system may also include a memory manager to write data from the volatile memory to a first non-volatile memory array and to write remaining data from the volatile memory region to a second non-volatile memory array in response to detecting an event has occurred. The second non-volatile memory array may have a lower write latency than the first non-volatile memory array.

The present disclosure describes a computer program product for managing data using a number of non-volatile memory arrays. The computer program product may include a computer readable storage medium. The computer readable storage medium may include computer usable program code. The computer usable program code may include computer usable program code to, when executed by a processor, write data from a volatile memory region to a first non-volatile memory array. The computer usable program code may also include computer usable program code to, when executed by a processor, write a remaining portion of the data from the volatile memory region to a second non-volatile memory array in response to detecting that an event has occurred. The computer usable program code may also include computer usable program code to, when executed by a processor, restore the data upon resolution of the event The second non-volatile memory array may have a lower write latency than the first non-volatile memory array. The remaining portion of the data may be a portion of the data that has not been written to the first non-volatile memory array.

As used in the present specification and in the appended claims, the term "event" may refer to any occurrence upon which data is intended to be quickly moved from a volatile memory region to a non-volatile memory array. Examples of events include a security breach where a computing device is turned off. Another example includes any type of power interruption such as an electrical short or power outage among other power interruptions.

Further, as used in the present specification and in the appended claims, the term "remaining portion" may refer to a portion of data that has not been written from the volatile memory region to the first non-volatile memory array.

Still further, as used in the present specification and in the appended claims, the term "a number of" or similar language may include any positive number including 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described is included in at least that one example, but not necessarily in other examples.

Turning now to the figures, FIG. 1 is a diagram of a system (100) for managing data using a number of non-volatile memory arrays (103) according to one example of the principles described herein. The system (100) may be utilized in any data processing scenario. Further, the system (100) may be used in a network setting. Further, the system (100) may be utilized within a single computing device. In this scenario, a single computing device may utilize the number of non-volatile memory arrays (103) to read data, write data, or otherwise manage data. The memory manager (101) may be part of a general purpose computer. However, in alternative examples, the memory manager (101) is part of an application specific integrated circuit.

To achieve its desired functionality, the system (100) may include various hardware components. Among these hardware components may be a memory manager (101) among other hardware components. These hardware components may be interconnected through the use of a number of busses and/or network connections. In one example, the number of busses that interconnect a number of these devices may be represented by the reference numeral (104). In other words, the reference numeral (104) may designate a connection and may not indicate a particular number of connections.

The memory manager (101) may include the hardware architecture to retrieve executable code and execute the executable code. The executable code may, when executed by the memory manager (101), cause the memory manager (101) to implement at least the functionality of managing data using a number of non-volatile memory arrays (103), according to the methods of the present specification described herein. In the course of executing code, the memory manager (101) may receive input from and provide output to a number of the remaining hardware units.

The system (100) may store data such as executable program code that is executed by the memory manager (101) or other processing device. As will be discussed, the system (100) may specifically store a number of applications that the memory manager (101) executes to implement at least the functionality described herein. More detail concerning the retrieval, execution, and storage of executable code is given below in connection with FIG. 6.

The system (100) may include various types of memory, including a volatile memory region (102) and a number of non-volatile memory arrays (103). The volatile memory region (102) may be any type of memory that uses power to store information. When the power is disconnected from the volatile memory region (102), the data stored therein may be lost. An example of a volatile memory region (102) may include Dynamic Random Access Memory (DRAM) in a dual in-line memory module (DIMM). The volatile memory region (102) may store intermediate data. For example, the volatile memory region (102) may act as a cache, temporarily holding data that is to be stored in the first non-volatile memory array (103*a*).

The volatile memory region (102) may also store metadata relating to data used by the system (100). For example, the volatile memory region (102) may include state information. The volatile memory region (102) may also include other metadata. For example, the volatile memory region (102) may include bits used to indicate the location of remapped data within memory and instructions on how to retrieve the remapped data. In another example, the volatile memory region (102) may include information used in a wear-leveling procedure. For example, in some cases particular bits within memory may be subject to more writing operations than other bits in memory. Such overwriting may wear those particular bits out faster than other bits in memory. A wear-leveling procedure may track write information and accordingly, may adjust where data is written to ensure approximately even writing across memory. The information used by a wear-leveling procedure may change often and rapidly. Accordingly, this wear-leveling information may be stored in the volatile memory region (102) such that it can be accessed quickly. Other examples of metadata that may be stored in the volatile memory region (102) includes data structure information and information on the location of data within memory.

Using a volatile memory region (102) may be beneficial in that it provides rapid access to certain types of data and metadata such as intermediate data, cache data, metadata, and data that is repeatedly accessed, among other types of data and metadata. The quick access provided by the volatile memory region (102) may improve overall system (100) performance.

The system may also include a number of non-volatile memory arrays (103-1, 103-2). Non-volatile memory may refer to memory that stores data without power. For example, in the event of a power loss, data that was written to the non-volatile memory arrays (103-1, 103-2) may still be accessed upon restoration of power. In some examples, the first non-volatile memory array (103-1), the second non-volatile memory array (103-2), or combinations thereof, may be memristor arrays.

A memristor may be a circuit element that maintains a relationship between the time integrals of current and voltage across a two terminal element. Using a memristor array as a non-volatile memory array (103) may be beneficial in that it may enable the system (100) to provide access latencies similar to a volatile memory (102) device while providing the non-volatility desirable for data storage. Additionally, the use of non-volatile memory arrays (103) may be beneficial in that they may provide durable data storage. In other examples, the systems and methods described herein may be implemented with other types of durable memory and storage devices such as hard disk drives (HDD) and solid state drives (SSD). An example of non-volatile memory (103) may include Read Only Memory (ROM), and Hard Disk Drive (HDD) memory. Similarly, the non-volatile memory (103) may be dual in-line memory modules (DIMMs).

Many other types of memory may also be utilized, and the present specification contemplates the use of many varying type(s) of memory in the system (100) as may suit a particular application of the principles described herein. In certain examples, different types of memory in the system (100) may be used for different data storage needs.

The non-volatile memory arrays (103) may include different characteristics to carry out different functions. For example, non-volatile memory arrays (103) may include characteristics that provide large storage capacity while providing write speeds similar to DRAM. By comparison, non-volatile memory arrays (103) may be designed to provide quicker write operations. In other words, non-volatile memory arrays (103) may be designed to have lower write latency than other non-volatile memory arrays (103). A non-volatile memory array (103) designed to have a lower write latency may be smaller than a non-volatile memory array (103) that provides a larger storage capacity. Other characteristics of a non-volatile memory array (103) that may be selected include data format, endurance of the non-volatile memory array (103), storage density of the non-volatile memory array (103), and power consumption by the non-volatile memory array (103), among other memory characteristics.

As described above, the system (100) may include a first non-volatile memory array (103-1) and a second non-volatile memory array (103-2). In some examples, the first non-volatile memory array (103-1) and the second non-volatile memory array (103-2) may have different characteristics. More specifically, the second non-volatile memory array (103-2) may have a lower write latency relative to the first non-volatile memory array (103-1). For example, the second non-volatile memory array (103-2) may have a smaller capacity than the first non-volatile memory array (103-1). In another example, the second non-volatile memory array (103-2) may implement a writing code that is quicker than a writing code used by the first non-volatile memory array (103-1). For example, data may be written to the first non-volatile memory array (103-1) in a slower, more controlled fashion to ensure the integrity of the data. By comparison, data may be written to the second non-volatile memory array (103-2) more quickly to ensure that the data is written to the array before power loss. In yet another example, the second non-volatile memory array (103-2) may be less dense than the first non-volatile memory array (103-1).

Similarly, the first non-volatile memory array (103-1) may produce a larger storage capacity relative to the second non-volatile memory array (103-2). The first non-volatile memory array (103-1) may also produce greater endurance relative to the second non-volatile memory array (103-2). That is, the first non-volatile memory array (103-1) may be designed to allow more writes to memory before the memory bits wear out and performance is reduced.

Including a number of non-volatile memory arrays (103-1, 103-2) that have different characteristics may be beneficial in that the second non-volatile memory array (103-2) may be used when data is to be moved quickly from the volatile memory region (102), such as in the event of a power interruption. In this instance, the second non-volatile memory array (103-2) may prevent the loss of data that may result when power is lost. For example, without the second non-volatile memory array (103-2), the data that is cached in the volatile memory region (102) that has not yet been moved to the first non-volatile memory array (103-1) may be lost on account of the slower write process associated with the first non-volatile memory array (103-1). Implementing the second non-volatile memory array (103-2), which has a lower write latency, may capture this data that would otherwise be lost. In other words, the quicker write process of the second non-volatile memory array (103-2) may increase the amount of data moved to non-volatile memory in the event of a power interruption.

Still further, the implementation of the second non-volatile memory array (103-2) may reduce the cost of the system (100). For example, the system (100) may include a number of components such as capacitors that create a delay between a power interruption and loss of power to the system (100). This delay may be a warning period during which data is transferred from the volatile memory region (102) to non-volatile memory. These capacitors represent a manufacturing cost of the system (100). Using the second non-volatile memory array (103-2) with its lower write latency may reduce the warning period, and accordingly reduce the quantity of capacitors. This reduction in the quantity of capacitors may reflect a reduction in the cost of the system (100).

While FIG. 1 depicts a single first non-volatile memory array (103-1) and a single second non-volatile memory array (103-2), any number of any type of non-volatile memory array (103-1, 103-2) may be implemented according to the principles described herein.

Generally, the system (100) may comprise a computer readable medium, a computer readable storage medium, or a non-transitory computer readable medium, among others. In the context of this document, a computer readable storage medium may be any tangible medium that can contain, or store a program for use by or in connection with an instruction execution system, apparatus, or device. In another example, a computer readable storage medium may be any non-transitory medium that can contain, or store a program for use by or in connection with an instruction execution system, apparatus, or device. The system (100) as described herein may be beneficial in that it allows for more data to be maintained in a fast volatile memory region (102) during operation by providing a quicker non-volatile memory array (103-2) to which data may be written quickly in the event of a power interruption.

Figure 2:
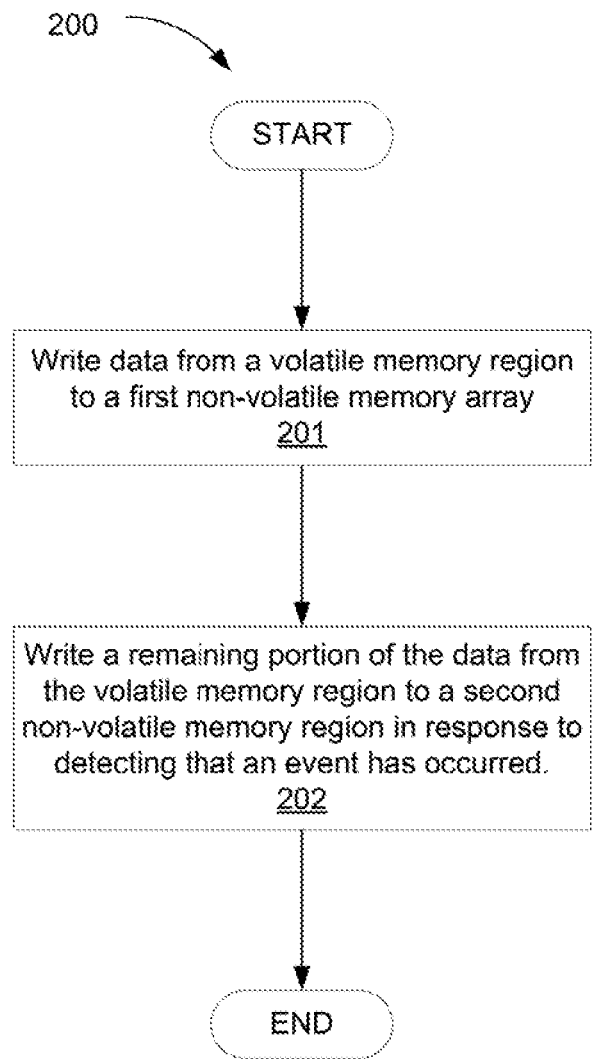
FIG. 2 is a flowchart of a method for managing data using a number of non-volatile memory arrays according to one example of the principles described herein.

FIG. 2 is a flowchart of a method (200) for managing data using a number of non-volatile memory arrays (FIG. 1, 103) according to one example of the principles described herein. The method (200) may include writing (block 201) data from a volatile memory region (FIG. 1, 102) to a first non-volatile memory array (FIG. 103-1). As described above, volatile memory may refer to memory that does not maintain data in the event of a power interruption. A volatile memory region (FIG. 1, 102) may be used to temporarily hold data. For example, the volatile memory region (FIG. 1, 102) may be a cache for data that is to be later written to a non-volatile memory region (FIG. 1, 103). The volatile memory region (FIG. 1, 102) may also hold information that is accessed repeatedly or that is updated repeatedly. For example, wear-level state information that may change many times over a short period may be included in the volatile memory region (FIG. 1, 102). Other examples of data that may be included in the volatile memory region (FIG. 1, 102) include state information and other metadata associated with data in the volatile memory region (FIG. 1, 102).

The memory manager (FIG. 1, 101) may write (block 202) a remaining portion of the data from the volatile memory region (FIG. 1, 102) to a second non-volatile memory region (FIG. 1, 103-2) in response to detecting that an event has occurred. For example, the memory manager (FIG. 1, 101) may detect that an event has occurred. As used herein, an event may include any circumstance where power is removed from the system (FIG. 1, 100). For example, in the event of a security breach, power may be removed from the system (FIG. 1, 100) to prevent unauthorized access to data. In another example, electrical circuitry and cabling may fail to provide adequate power to the system (FIG. 1, 100). Other examples of events include a power interruption, disconnection from a power supply, among other events that lead to power being removed from the system (FIG. 1, 100). In some examples, the system (FIG. 1, 100) may include a number of mechanisms to detect an event such as a power supply failure detection mechanism, a drooping voltage detection mechanism, a component failure detection mechanism, a breaker flip detection mechanism, among other types of event detection mechanisms.

In the case that an event has not occurred, the memory manager (FIG. 1, 101) may move the data to a first non-volatile memory array (FIG. 1, 103-1). As described above, the first non-volatile memory array (FIG. 1, 103-1) may be optimized to produce larger memory storage and greater endurance relative to the second non-volatile memory array (FIG. 1, 103-2).

In the case that an event has occurred, the memory manager (FIG. 1, 101) may write (block 202) the remaining portion of the data to a second non-volatile memory array (FIG. 1, 103-2). The remaining portion of the data may be that portion that has not already been written (block 201) to the first non-volatile memory array (FIG. 1, 103-1). As described above, the second non-volatile memory array (FIG. 1, 103-2) may have a lower write latency than the first non-volatile memory array (FIG. 1, 103-1). Such lower write latency may include designing the second non-volatile memory array (FIG. 1, 103-2) to have a smaller capacity than the first non-volatile memory array (FIG. 1, 103-1), implement a quicker writing format than one used by the first non-volatile memory array (FIG. 1, 103-1), and to be less dense than the first non-volatile memory array (FIG. 1, 103-1), among other design criteria.

Implementing a number of non-volatile memory arrays (FIG. 1, 103) may be beneficial in that it may reduce the duration of a warning period during which data is moved from the volatile memory region (FIG. 1, 102). For example, using just the first non-volatile memory array (FIG. 1, 103-1), which is optimized to provide greater storage capacity and may implement a slower writing process, may necessitate a greater warning period to move the data from the volatile memory region (FIG. 1, 102) to the first non-volatile memory array (FIG. 1, 103-1).

By comparison, using the second non-volatile memory array (FIG. 1, 103-2), which may have a lower write latency, to receive the information upon the detection of an event may reduce the duration of the warning period needed to move the data from the volatile memory region (FIG. 1, 102) to the second non-volatile memory array (FIG. 1, 103-2). Such a reduction in the warning period may reduce the amount of components within a system (FIG. 1, 100) to facilitate such a warning period and accordingly may reduce the cost of the system (FIG. 1, 100).

Figure 3:
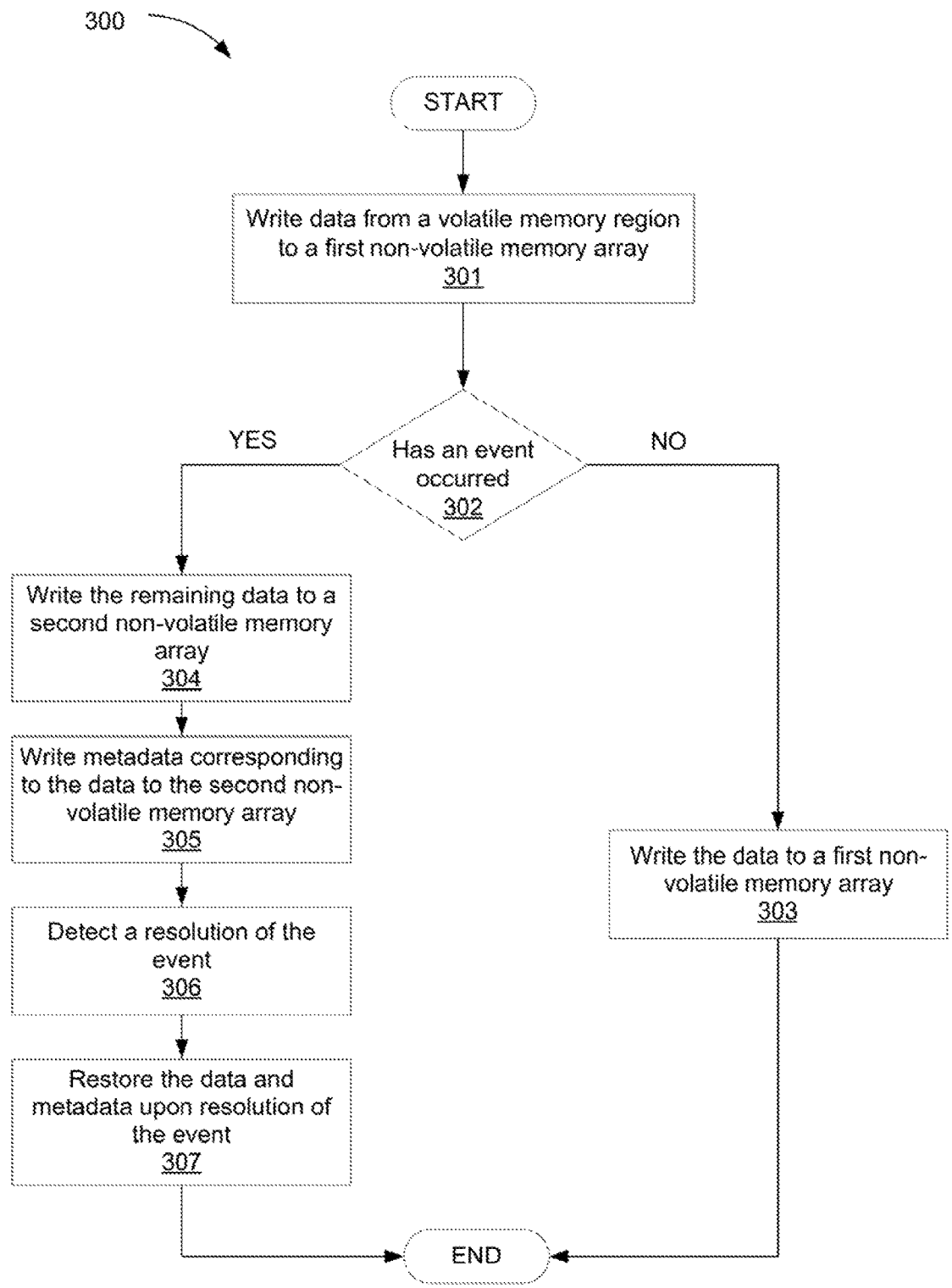
FIG. 3 is a flowchart of another method for managing data using a number of non-volatile memory arrays according to one example of the principles described herein.

FIG. 3 is a flowchart of another method (300) for managing data using a number of non-volatile memory arrays (FIG. 1, 103) according to one example of the principles described herein. The method (300) may include writing (block 301) data from a volatile memory region (FIG. 1, 102) to a first non-volatile memory array (FIG. 1, 103-1). This may be performed as described in connection with FIG. 2. The memory manager (FIG. 1, 101) may determine (block 302) whether an event has occurred. This may be performed as described in connection with FIG. 2. If an event has not occurred (block 302, determination NO), the memory manager (FIG. 1, 101) may write (block 303) the data to a first non-volatile memory array (FIG. 1, 103-1). If an event has occurred, (block 302, determination YES), the memory manager (FIG. 1, 101) may write (block 304) a remaining portion of the data to a second non-volatile memory array (FIG. 1, 103-2). This may be performed as described in connection with FIG. 2.

The memory manager (FIG. 1, 101) may also write (block 305) metadata corresponding to the data to the second non-volatile memory array (FIG. 1, 103-2). As described above, the metadata may be state information, or other data that is used to process data. For example, metadata may include information about the design and specifications of data structures. Metadata may also include information about individual instances of data. In some examples, metadata may include information on where data that has been moved to the second non-volatile array (FIG. 1, 103-2) should be moved to when the event is resolved. Specific examples of metadata that may be moved to the second non-volatile memory array (FIG. 1, 103-2) include state information that may be used by a computing device to process and execute the data. Another example of metadata that may be included is wear-leveling data that indicates a number of write operations performed with respect to the memory. Such information, if not stored in non-volatile memory may prevent the computing device from processing the data upon the return of the data to the volatile memory region (FIG. 1, 102).

In some examples, the memory manager (FIG. 1, 101) may detect (block 306) a resolution of the event. For example, the memory manager (FIG. 1, 101) may detect that power has been restored to a computing device that is communicatively coupled to the system (FIG. 1, 100). In some examples, the system (FIG. 1, 100) may include a number of mechanisms to detect when an event has been resolved. In these examples, the event detection mechanisms may detect that an event has been resolved, such as power being restored to the system (FIG. 1, 100).

Upon resolution of the event, the memory manager (FIG. 1, 101) may restore (block 307) data, metadata, or combinations thereof. More specifically, upon resolution of the event, the memory manager (FIG. 1, 101) may move data and metadata from the second non-volatile memory array (FIG. 1, 103-2) to the first non-volatile memory array (FIG. 1, 103-1). For example, as described above, when an event is detected, the memory manager (FIG. 1, 101) may move data that was cached in the volatile memory region (FIG. 1, 102) and destined for the first non-volatile memory array (FIG. 1, 103-1) to the second non-volatile memory region (FIG. 1, 103-2). Upon event resolution, this data may be restored to its destined location at the first non-volatile memory array (FIG. 1, 103-1).

Similarly, upon resolution of the event, the memory manager (FIG. 1, 101) may move data, metadata, or combinations thereof from the second non-volatile memory array (FIG. 1, 103-2) to the volatile memory region (FIG. 1, 102). For example, as described above, when an event is detected, the memory manager (FIG. 1, 101) may move state information data that was stored in the volatile memory region (FIG. 1, 102) to the second non-volatile memory region (FIG. 1, 103-2). Upon resolution of the event, the memory manager (FIG. 1, 102) may move this data back to the volatile memory region (FIG. 1, 102).

Figure 4:
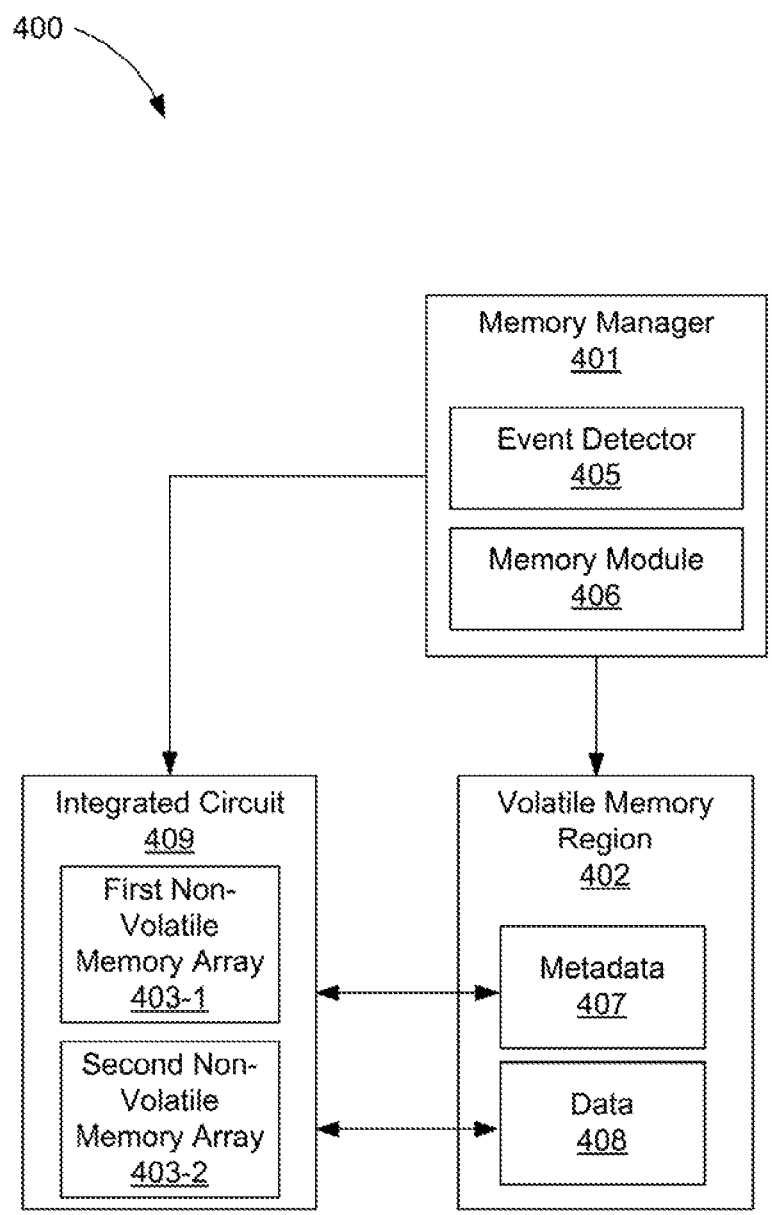
FIG. 4 is a diagram of a system for managing data using a number of non-volatile memory arrays according to one example of the principles described herein.

FIG. 4 is a diagram of a system (400) for managing data using a number of non-volatile memory arrays (403) according to one example of the principles described herein. As described above, the system (400) may include a memory manager (401) that manages the movement of data (408) and metadata (407) between the volatile memory region (402) and the number of non-volatile memory arrays (403). In this example, the memory manager (401) may include an event detector (405). The event detector (405) may detect that an event, such as power loss or other power interruption has occurred. Similarly, the event detector (405) may detect when an event has been resolved. For example, the event detector (405) may detect that power has been restored.

The memory manager (401) may also include a memory module (406) that manages the movement of data (408) and metadata (407) between the volatile memory region (402) and the non-volatile memory arrays (403). For example, under operating conditions, i.e., no event such as a power failure has occurred, the memory module (406) may move data (408) and metadata (407) between the volatile memory region (402) and the first non-volatile memory array (403-1). If an event has occurred, the memory module (406) may move data (408) and metadata (407) from the volatile memory region (402) to the second non-volatile memory array (403-2). Upon resolution of the event, the memory module (406) may move data (408) and metadata (407) from the second non-volatile memory array (403-2) to the first non-volatile memory array (403-1), the volatile memory region (402), or combinations thereof. As indicated in FIG. 4, in some examples, the first non-volatile memory array (403-1) and the second non-volatile memory array (403-2) may be located on a single integrated circuit (409). In this example, the memory manager (401) may access both the first non-volatile memory array (403-1) and the second non-volatile memory array (403-2) via a single interface. Accordingly, the first non-volatile memory array (403-1) and the second non-volatile memory array (403-2) may be distinguished based on memory addresses.

Figure 5:
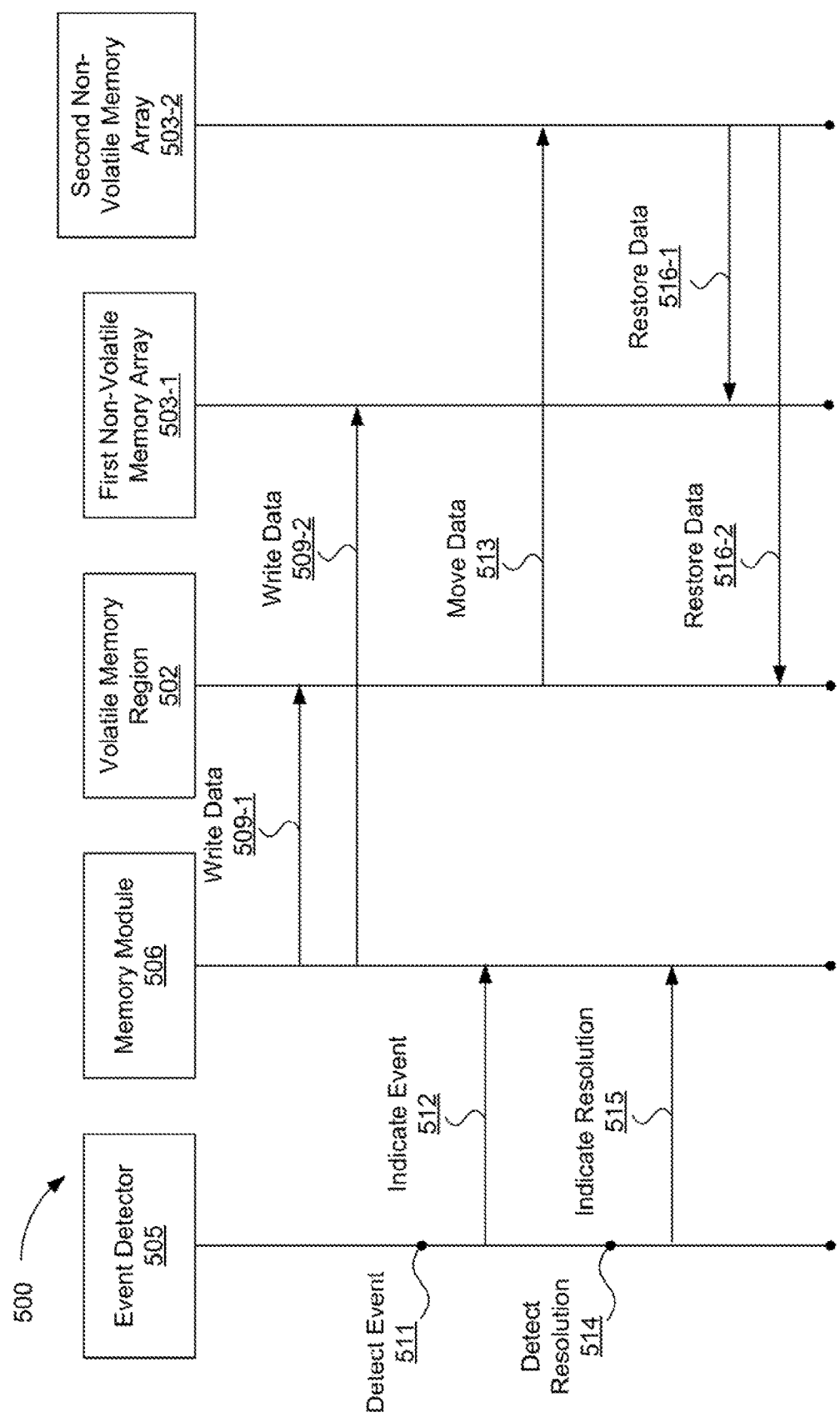
FIG. 5 is a thread diagram of managing data using a number of non-volatile memory arrays according to one example of the principles described herein.

FIG. 5 is a thread diagram (500) of managing data (FIG. 4, 408) using a number of non-volatile memory arrays (503) according to one example of the principles described herein. First, the memory module (506) may write (509-1) data (FIG. 4, 408) and metadata (FIG. 4, 407) to the volatile memory region (502). The memory module (506) may also write (509-2) data (FIG. 4, 408) and metadata (FIG. 4, 407) to the first non-volatile memory array (503-1). The event detector (505) may detect (511) an event and may indicate (512) to the memory module (506) that an event has occurred. The memory module (506) may move (513) the data (FIG. 4, 408) and metadata (FIG. 4, 407) to the second non-volatile memory array (503-2) to preserve the data (FIG. 4, 408) and metadata (FIG. 4, 407) despite the impending loss of power. The event detector (505) may then detect (514) a resolution of the event and may indicate (515) to the memory module (506) that the event has been resolved. The memory module (506) may restore (516-1) the data (FIG. 4, 408) and metadata (FIG. 4, 407) to the first non-volatile memory array (503-1). The memory module (506) may also restore (516-2) the data (FIG. 4, 408) and metadata (FIG. 4, 407), to the volatile memory region (502).

Figure 6:
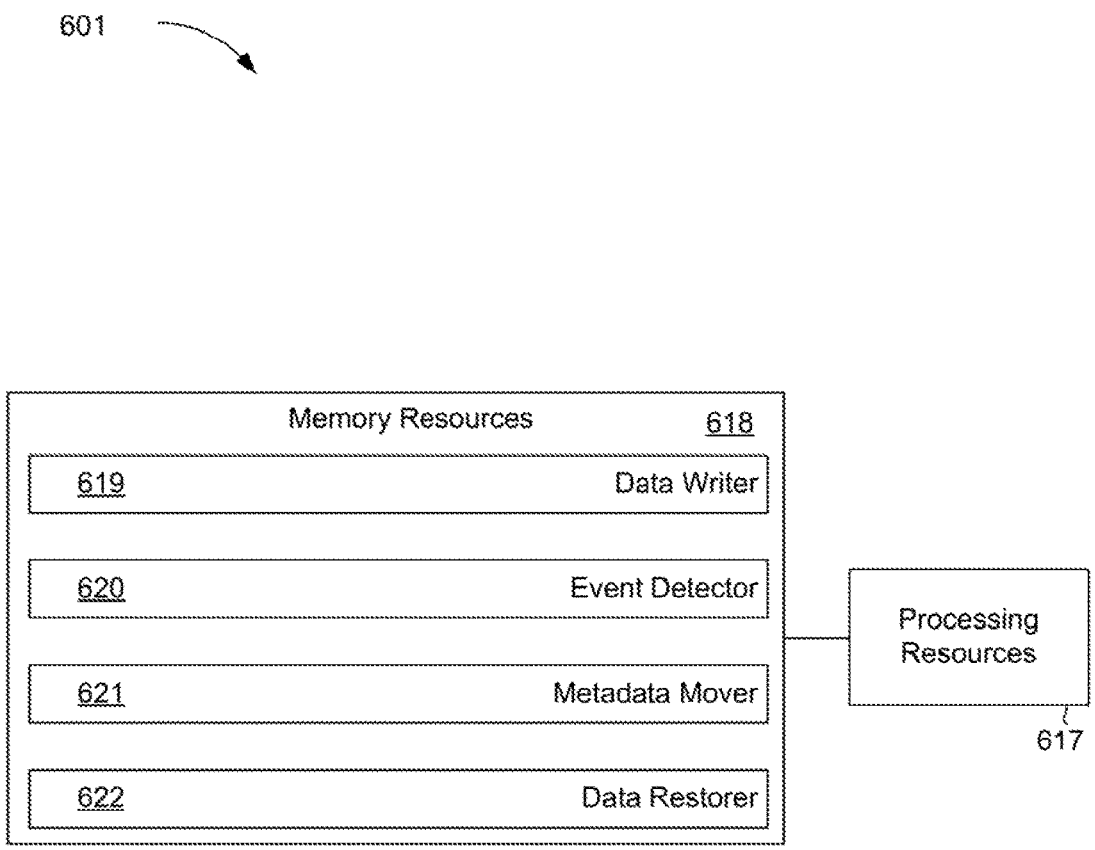
FIG. 6 is a diagram of a memory manager for managing data using a number of non-volatile memory arrays according to one example of the principles described herein.

FIG. 6 is a diagram of a memory manager (601) for managing data (FIG. 4, 408) using a number of non-volatile memory arrays (FIG. 1, 103) according to one example of the principles described herein. The memory manager (601) may include the hardware architecture to retrieve executable code and execute the executable code. The executable code may, when executed by the memory manager (601), cause the memory manager (601) to implement at least the functionality of managing data (FIG. 4, 408) using a number of non-volatile memory arrays (FIG. 1, 103), according to the methods of the present specification described herein. In the course of executing code, the memory manager (601) may receive input from and provide output to a number of the remaining hardware units.

In this example, the memory manager (601) may include processing resources (617) that are in communication with memory resources (618). Processing resources (617) may include at least one processor and other resources used to process programmed instructions. The memory resources (618) represent generally any memory capable of storing data such as programmed instructions or data structures used by the memory manager (601). The programmed instructions shown stored in the memory resources (618) may include a data writer (619), an event detector (620), a metadata mover (621), and a data restorer (622).

The memory resources (618) include a computer readable storage medium that contains computer readable program code to cause tasks to be executed by the processing resources (617). The computer readable storage medium may be tangible and/or physical storage medium. The computer readable storage medium may be any appropriate storage medium that is not a transmission storage medium. A non-exhaustive list of computer readable storage medium types includes non-volatile memory, volatile memory, random access memory, write only memory, flash memory, electrically erasable program read only memory, or types of memory, or combinations thereof.

The data writer (619) represents programmed instructions that, when executed, cause the processing resources (617) to write data (FIG. 4, 408) from a volatile memory region (FIG. 1, 102) to a first non-volatile memory array (FIG. 1, 103-1). The data writer (619) may also write a remaining portion of the data to the second non-volatile memory array (FIG. 1, 103-2) in response to detecting that an event has occurred. The event detector (620) represents programmed instructions that, when executed, cause the processing resources (617) to detect whether an event has occurred. The event detector (620) also represents programmed instructions that, when executed, cause the processing resources (617) to detect a resolution of the event. The metadata mover (621) represents programmed instructions that, when executed, cause the processing resources (617) to move metadata (FIG. 4, 407) corresponding to the data (FIG. 4, 408) to the second non-volatile memory array (FIG. 1, 103-2). The metadata mover (621) may be implemented by the memory module (FIG. 4, 406). The data restorer (622) represents programmed instructions that, when executed, cause the processing resources (617) to restore the data (FIG. 4, 408), the metadata (FIG. 4, 407), or combinations thereof. The data restorer (622) may be implemented by the memory module (FIG. 4, 406). Restoring the data (FIG. 4, 408), metadata (FIG. 4, 407), or combinations thereof may include moving the data (FIG. 4, 408), the metadata (FIG. 4, 407), or combinations thereof to the volatile memory region (FIG. 1, 102), the first non-volatile memory array (FIG. 1, 103-1), or combinations thereof.

Further, the memory resources (618) may be part of an installation package. In response to installing the installation package, the programmed instructions of the memory resources (618) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources (617) and the memory resources (618) are located within the same physical component, such as a server, or a network component. The memory resources (618) may be part of the physical component's main memory, caches, registers, non-volatile memory, or elsewhere in the physical component's memory hierarchy. Alternatively, the memory resources (618) may be in communication with the processing resources (617) over a network. Further, the data structures, such as the libraries, may be accessed from a remote location over a network connection while the programmed instructions are located locally. Thus, the memory manager (601) may be implemented on a user device, on a server, on a collection of servers, or combinations thereof.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processing resources (617) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

Methods and systems for managing data using a number of non-volatile memory arrays may have a number of advantages, including: (1) enhancing data survivability in the face of power interruption; (2) maintaining a reduced apparent latency; (3) improving system performance; (4) overcoming complications associated with slower write operation to non-volatile memory; and (5) reducing the cost of memory systems and corresponding computing devices.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method for managing data using a number of non-volatile memory arrays, comprising:
   writing data from a volatile memory region to a first non-volatile memory array; and
   writing a remaining portion of the data from the volatile memory region to a second non-volatile memory array in response to detecting that an event has occurred while writing the data to the first non-volatile memory array;
   wherein the second non-volatile memory array has a lower write latency than the first non-volatile memory array.

2. The method of claim 1, in which the second non-volatile memory array has a smaller capacity than the first non-volatile memory array.

3. The method of claim 1, in which the second non-volatile memory array implements a second writing code that is quicker than a first writing code implemented by the first non-volatile memory array.

4. The method of claim 1, in which the second non-volatile memory array is less dense than the first non-volatile memory array.

5. The method of claim 1, in which the first non-volatile memory array has a larger storage capacity than the second non-volatile memory array.

6. The method of claim 1, in which the first non-volatile memory array has greater endurance than the second non-volatile memory array.

7. The method of claim 1, further comprising moving metadata corresponding to the data to the second non-volatile memory array.

8. The method of claim 1, in which the event comprises a power loss event.

9. The method of claim 7, further comprising restoring the data, the metadata, or combinations thereof, upon resolution of the event.

10. A system for managing data using a number of non-volatile memory arrays, comprising:
    volatile memory;
    a first non-volatile memory array;
    a second non-volatile memory array; and
    a memory manager to:
      write data from the volatile memory to a first non-volatile memory array; and
      write remaining data from the volatile memory to a second non-volatile memory array in response to detecting an event has occurred while writing the data to the first non-volatile memory array;
    in which the second non-volatile memory array has a lower write latency than the first non-volatile memory array.

11. The system of claim 10, in which the first non-volatile memory array, the second non-volatile memory array, or combinations thereof are memristor arrays.

12. The system of claim 10, further comprising an event detector to detect an event and direct the memory manager to write data to the second non-volatile memory array based on the detected event.

13. The system of claim 10, in which the first non-volatile memory array and the second non-volatile memory array are located on a single integrated circuit.

14. The system of claim 10, wherein the volatile memory comprises a cache for the first non-volatile memory array and a metadata storage for metadata corresponding to the data.

15. The system of claim 10, wherein the event comprises a power loss event.

16. The system of claim 10, wherein the memory manager is to store the remaining portion of the data in the first non-volatile memory array in response to resolution of the event.

17. A computer program product for managing data using a number of non-volatile memory arrays, the computer program product comprising:

a non-transitory computer readable storage medium comprising computer usable program code embodied therewith, the computer usable program code comprising:

computer usable program code to, when executed by a processor, write data from a volatile memory region to a first non-volatile memory array;

computer usable program code to, when executed by a processor, write a remaining portion of the data from the volatile memory region to a second non-volatile memory array in response to detecting that an event has occurred while writing the data to the first non-volatile memory array; and computer usable program code to, when executed by a processor, restore the data upon resolution of the event;

wherein the second non-volatile memory array has a lower write latency than the first non-volatile memory array, and wherein the remaining portion of the data is a portion of data that has not been written to the first non-volatile memory array.

18. The computer program product of claim 17, in which restoring the data comprises moving the data to the first non-volatile memory array, volatile memory, or combinations thereof.

19. A system for managing data using a number of non-volatile memory arrays, comprising:

volatile memory;

an integrated circuit comprising a first non-volatile memory array, and a second non-volatile memory array; and a memory manager to:

write data from the volatile memory to the first non-volatile memory array using an interface; and write metadata corresponding to the data from the volatile memory to a second non-volatile memory array using the interface in response to detecting an event has occurred;

in which the second non-volatile memory array has a lower write latency than the first non-volatile memory array.

20. The system of claim 19, wherein the event comprises a power loss event.

21. The system of claim 19, wherein the memory manager is to restore the metadata to the volatile memory after resolution of the event.

\* \* \* \* \*